US010005382B1

(12) United States Patent
Rossi et al.

(10) Patent No.: US 10,005,382 B1
(45) Date of Patent: Jun. 26, 2018

(54) MOBILE DISPLAY AND MARKETING APPARATUS

(71) Applicant: RGI MARKETING GROUP, INC., Altamonte Springs, FL (US)

(72) Inventors: Tony Rossi, Apopka, FL (US); Ryan Solomon, Altamonte Springs, FL (US)

(73) Assignee: RGI Marketing Group, Inc., Altamonte Springs, FL (US)

( * ) Notice: Subject to any disclaimer, the term of this patent is extended or adjusted under 35 U.S.C. 154(b) by 0 days. days.

(21) Appl. No.: 15/397,337

(22) Filed: Jan. 3, 2017

(51) Int. Cl.
*B60P 3/025* (2006.01)
*A47F 5/00* (2006.01)
*G09F 21/04* (2006.01)

(52) U.S. Cl.
CPC .......... *B60P 3/0255* (2013.01); *A47F 5/0093* (2013.01); *G09F 21/04* (2013.01)

(58) Field of Classification Search
CPC .... B60P 3/0255; B60P 3/0257; A47F 5/0093; G09F 21/04
USPC .......................................................... 296/21
See application file for complete search history.

(56) References Cited

U.S. PATENT DOCUMENTS

| 2,982,578 | A | * | 5/1961 | Lowe | ................... | B60P 3/0257 296/22 |
| 2004/0026946 | A1 | * | 2/2004 | Reed, III | ............. | B60P 3/0257 296/24.3 |
| 2004/0027001 | A1 | * | 2/2004 | Reed, III | ............. | B60P 3/0257 307/10.1 |
| 2009/0127306 | A1 | * | 5/2009 | Mims | .................... | B60P 3/0257 224/404 |
| 2009/0289017 | A1 | * | 11/2009 | Koeze | .................... | A47B 43/00 211/1.3 |
| 2012/0031686 | A1 | * | 2/2012 | Ferrigni | ................ | B60P 3/0257 180/2.2 |
| 2013/0099519 | A1 | * | 4/2013 | Cohen | ..................... | B60R 13/00 296/21 |
| 2013/0160755 | A1 | * | 6/2013 | Amat I. Pujol | ....... | B60P 3/0257 126/4 |
| 2014/0217765 | A1 | * | 8/2014 | Johnson | ................ | B60P 3/0255 296/21 |

* cited by examiner

*Primary Examiner* — Gregory A Blankenship
(74) *Attorney, Agent, or Firm* — Dickinson Wright PLLC

(57) ABSTRACT

A mobile display and marketing apparatus, including a self-propelled vehicle having an interior storage area accessible from an exterior of the vehicle; and a product display unit including a first part and a second part, wherein the second part is movable relative to the first part between a first position, in which the second part is received in the first part, and a second position, in which the second part extends away from the first part. The product display unit is characterized by a first, disassembled configuration in which the second part is in the second position thereof and at least the first and second parts are entirely contained in the interior storage area of the vehicle, and a second, assembled configuration in which the first part is partially disposed in the interior storage area of the vehicle and extends outwardly to the exterior of the vehicle, the second part is in the second position thereof, and at a first support is connected to the second part and extends therefrom to contact the ground or other support surface to support the product display unit.

18 Claims, 9 Drawing Sheets

MOBILE DISPLAY AND MARKETING APPARATUS

FIELD OF THE INVENTION

The present invention relates to mobile product displays.

BACKGROUND OF THE INVENTION

Retail advertising and sales have historically been relegated to fixed structures such as free standing buildings or malls that include a showroom for potential customers to browse through product displays and then select the merchandise they wish to purchase. These fixed showrooms require the purchaser to make a special trip to the building location. Often, the distances involved are substantial enough to discourage the purchaser from making the journey or require more time than the purchaser has available to travel to the store.

The Internet has opened a new means of shopping for the computer literate population. Almost every product available today in the retail marketplace is also available for purchase through the Internet. With just a few strokes of the keyboard, an individual can browse a variety of products, find product comparison reviews, and select and purchase the product for delivery to the individual's home or business. However, Internet purchases require the electronic transfer of financial information such as bank account numbers or credit card numbers. While great strides have been made to insure confidentiality of such financially sensitive information, it is still subject to misappropriation and interception and misuse by unauthorized individuals. Many purchasers refuse to risk the theft of their financial and identity information and as such will not purchase products via the Internet. Also, such remote purchasing denies the purchaser the ability to view the product in a "hands on" environment such as that afforded by an in-store display.

Consumer retail malls have become very popular over the past fifty years and can now be found in almost every major metropolitan area. These malls are constructed as very large structures with a multitude of individual subdivisions for independent stores that all share a common pedestrian area for the convenience of customers. Small kiosks have also been introduced into these common areas. The kiosk is merely a small display area located in the common pedestrian traffic areas of the malls wherein each kiosk is dedicated to the sale of a single product. However, while these kiosks may be repositionable within the pedestrian area, they are also limited as to their mobility.

SUMMARY OF THE INVENTION

In a preferred embodiment, methods and apparatus are provided for advertising, promoting, marketing, and/or selling products and services, as described herein. The inventions include a mobile vehicle for such advertising, promotion, marketing and sales, wherein the vehicle is self-propelled and self-contained for transport to, and operation in, any locale. A showroom affixed to or carried by or in the moving vehicle, the vehicle acting as a moving showroom, mobile kiosk, or mobile store.

In one preferred embodiment, the showroom has side panels on three or four sides which can be raised, removed or retracted to allow customers to view the products within the showroom. Further preferably, the panels have advertising on both sides, providing advertising billboards that are visible on all of the sides of the vehicle, such that three hundred and sixty degrees of billboard signage are present on the vehicle to promote particular products and services. Those products and services can include electronics and electrical devices, mechanical products, consumer products, or other objects. The products can be promoted for sale from the moving showroom, or for sale from other outlets, whether retail stores, internet sales or so forth.

In this manner, the present system allows salespeople to promote, market, and sell products and services on a mobile platform. The vehicle allows a company to bring a showroom with items directly to the consumer in any desired environment, allowing salespeople the ability to easily and efficiently demonstrate and promote those products to consumers in that environment, such that the consumers can touch and feel them. The functions and advantages of their products and services are brought directly to consumers, rather than requiring them to come to a retail store, allowing companies and their sales people a new system for promoting, marketing, advertising and selling those products.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which.

SUMMARY OF THE DISCLOSURE

Figure 1:
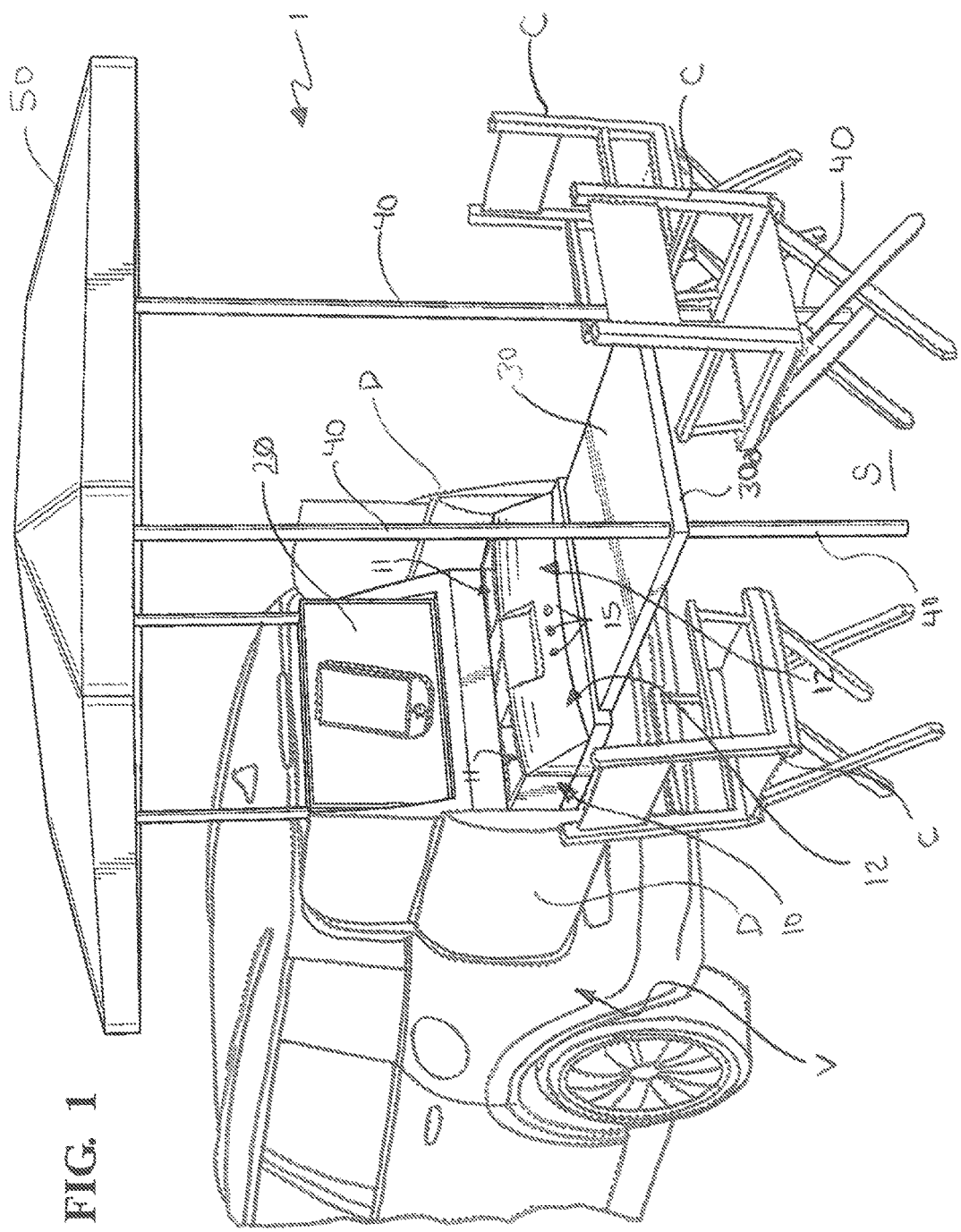
FIGS. 1 and 2 are perspective views of the mobile display and marketing apparatus according to the exemplary embodiment.

There is disclosed herein a mobile display and marketing apparatus, comprising: a self-propelled vehicle having an interior storage area accessible from an exterior of the vehicle; and a product display unit including a first part and a second part, wherein the second part is movable relative to the first part between a first position, in which the second part is received in the first part, and a second position, in which the second part extends away from the first part. The product display unit is characterized by a first, disassembled configuration in which the second part is in the second position thereof and at least the first and second parts are entirely contained in the interior storage area of the vehicle, and a second, assembled configuration in which the first part is partially disposed in the interior storage area of the vehicle and extends outwardly to the exterior of the vehicle, the second part is in the second position thereof, and at a first support is connected to the second part and extends therefrom to contact the ground or other support surface to support the product display unit.

In one embodiment, the apparatus further comprises a cover adapted to be positioned vertically above the product display unit by at least second and third supports, the second support connectible at a lower end thereof to the first part in the assembled configuration of the product display unit, and the third support connectible at a lower end thereof to the second part in the assembled configuration of the product display unit.

In one form, the first and third supports define a common support which is receivable through an opening in the second part so as to extend therethrough and to simultaneously position the cover vertically above the product display unit and define a support for the product display unit. The first and third supports may be a single, monolithic element or may be separate elements which are connected together to form a unitary element.

In one embodiment, the first part includes a support surface and a monitor mounted on the support surface, the monitor adapted to display audiovisual content, and wherein further the monitor is substantially vertically oriented in the assembled configuration of the product display unit and substantially horizontally oriented in the disassembled configuration of the product display unit.

DETAILED DESCRIPTION

Referring now to the drawings, wherein like numerals indicate like or corresponding parts throughout the several views, the invention may be seen to be a mobile display and marketing apparatus 1. In the manner described more fully herein, the apparatus 1 is adapted to be compactly stowed within a cargo area (e.g., the rear cargo area) of a vehicle V (such as a car, golf cart, etc.) for purposes of transport between desired locations, at which desired locations the apparatus is set up to define a temporary showroom for marketing and/or commercial transactions between one or more salespersons and one or more customers. The showroom provides areas for, as appropriate to the circumstances, the display of products or services, presentation of product, service, or commercial information, as well as a transactional area for customer interactions. Optionally, seating for customers and/or salespeople may be provided. Also optionally, the apparatus may be provided with an overhead cover, such as an umbrella, to provide protection from the elements (sun, rain, etc.). The overhead cover may bear advertising or other commercial indicia (such as logos, etc.), which may be provided on the overhead cover in any conventional manner.

As shown in the drawings, the apparatus 1 essentially comprises: a self-propelled vehicle V (partially shown in the drawings) having an interior storage area accessible from an exterior of the vehicle (such as via rear doors D); and a product display unit including a first part 10 and a second part 30, wherein the second part 30 is movable relative to the first part 10 between a first position, in which the second part is received in the first part, and a second position, in which the second part extends away from the first part.

Vehicle V is a conventional vehicle which may, as noted, be a car, golf cart, etc. While the drawings show only the second position, it will be appreciated with the benefit of this disclosure that, in the first position, the second part 30 is substantially or entirely received in the first part 10 such as, for instance a without limitation, by being slid underneath the first part.

The product display unit is further characterized by each of a first, disassembled configuration in which the second part 30 is in the second position thereof and at least the first part 10 and second 30 parts are entirely contained in the interior storage area of the vehicle V, as well as a second, assembled configuration (shown in the drawings) in which the first part 10 is partially disposed in the interior storage area of the vehicle V and extends outwardly to the exterior of the vehicle (see FIGS. 1 and 2), the second part 30 is in the second position thereof, and at least a first support 40 is connected to the second part 30 and extends therefrom to contact the ground or other support surface S to support the product display unit.

Figure 2:
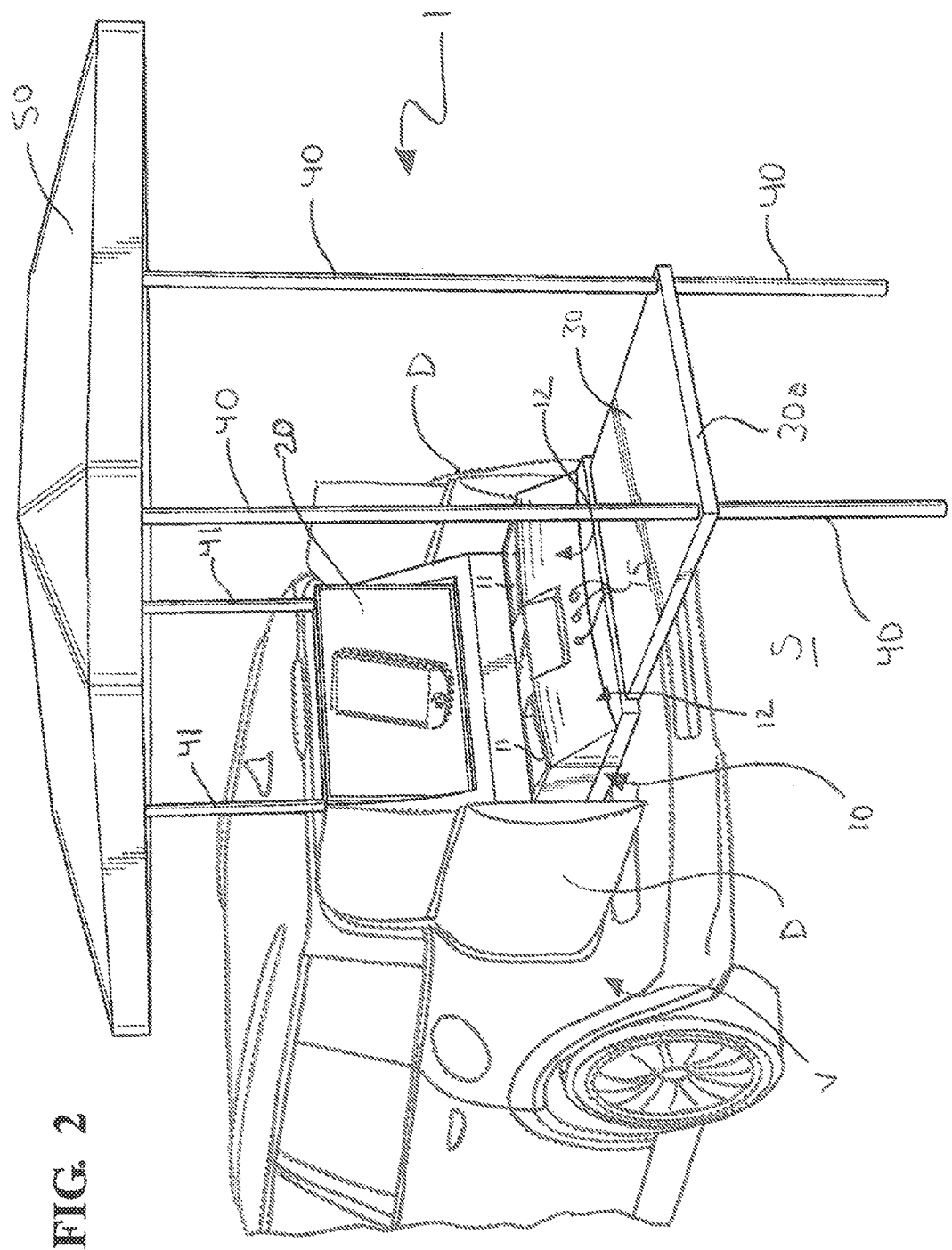
Figure 3:
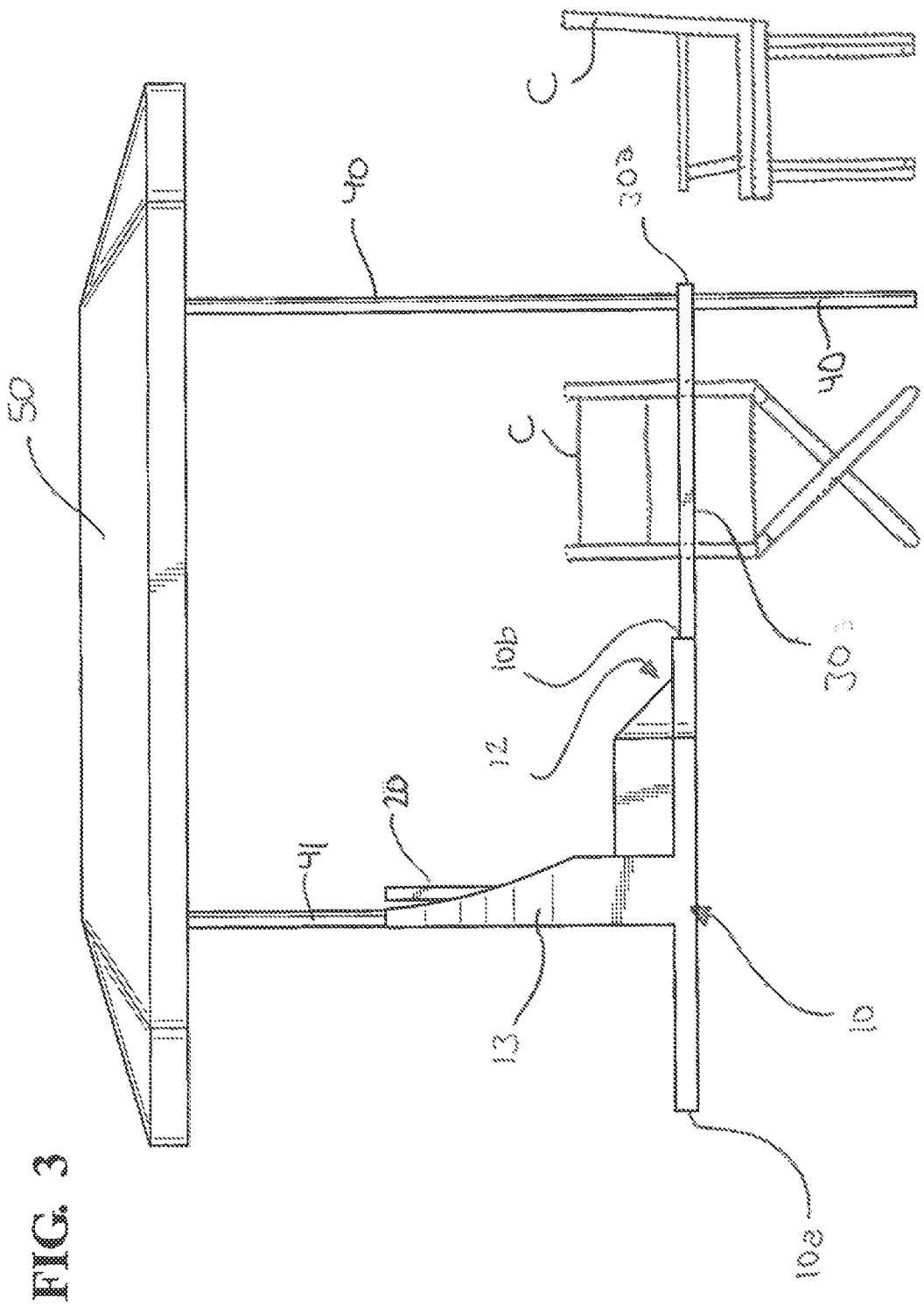
FIG. 3 is a side elevation view of the mobile display and marketing apparatus according to the exemplary embodiment.
Figure 4:
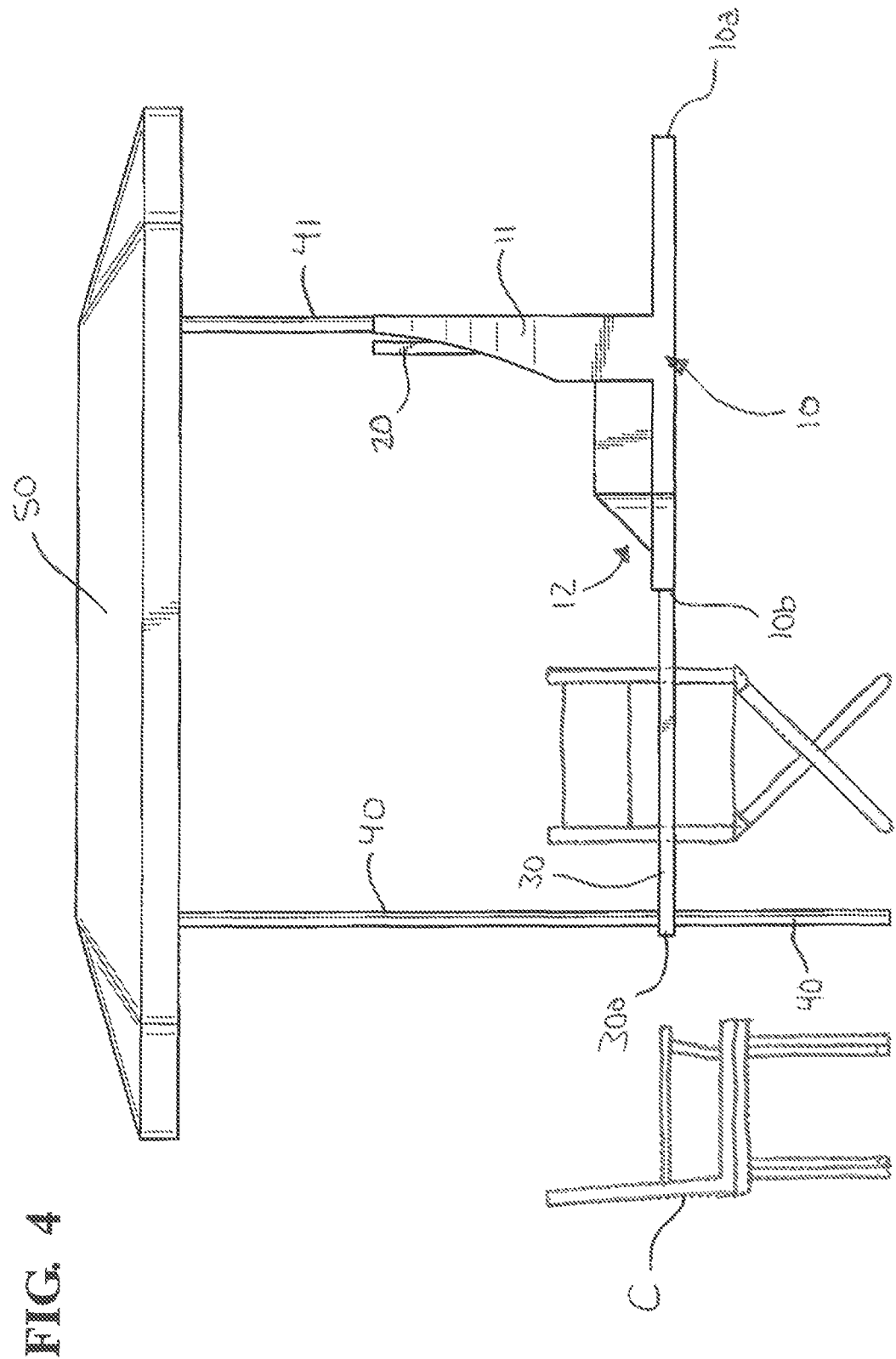
FIG. 4 is a side elevation view of the mobile display and marketing apparatus according to the exemplary embodiment, taken from the opposite side of that shown in FIG. 3.
Figure 5:
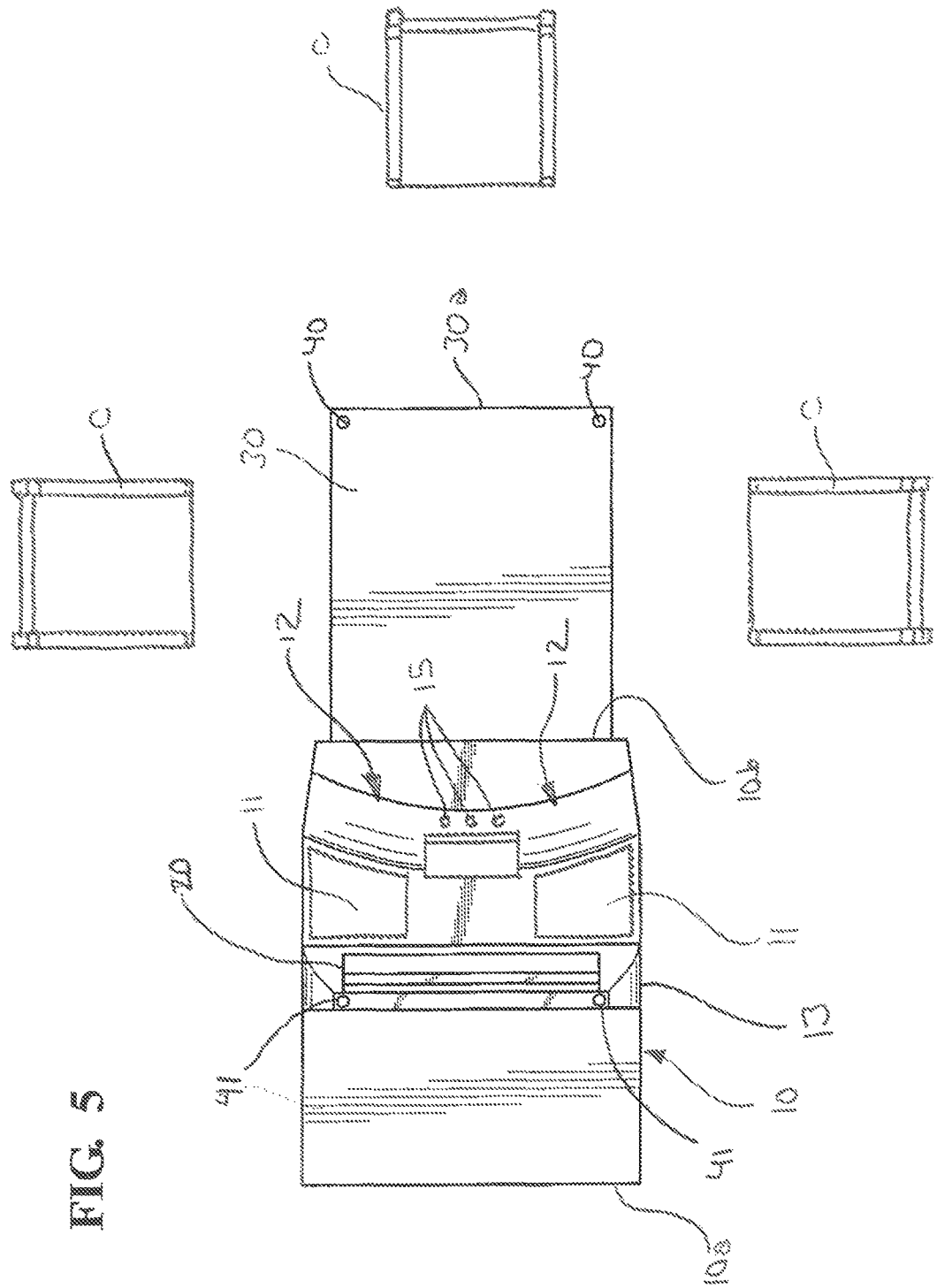
FIG. 5 is a top view of the mobile display and marketing apparatus according to the exemplary embodiment, taken from below the cover shown in FIGS. 1 through 4.
Figure 6:
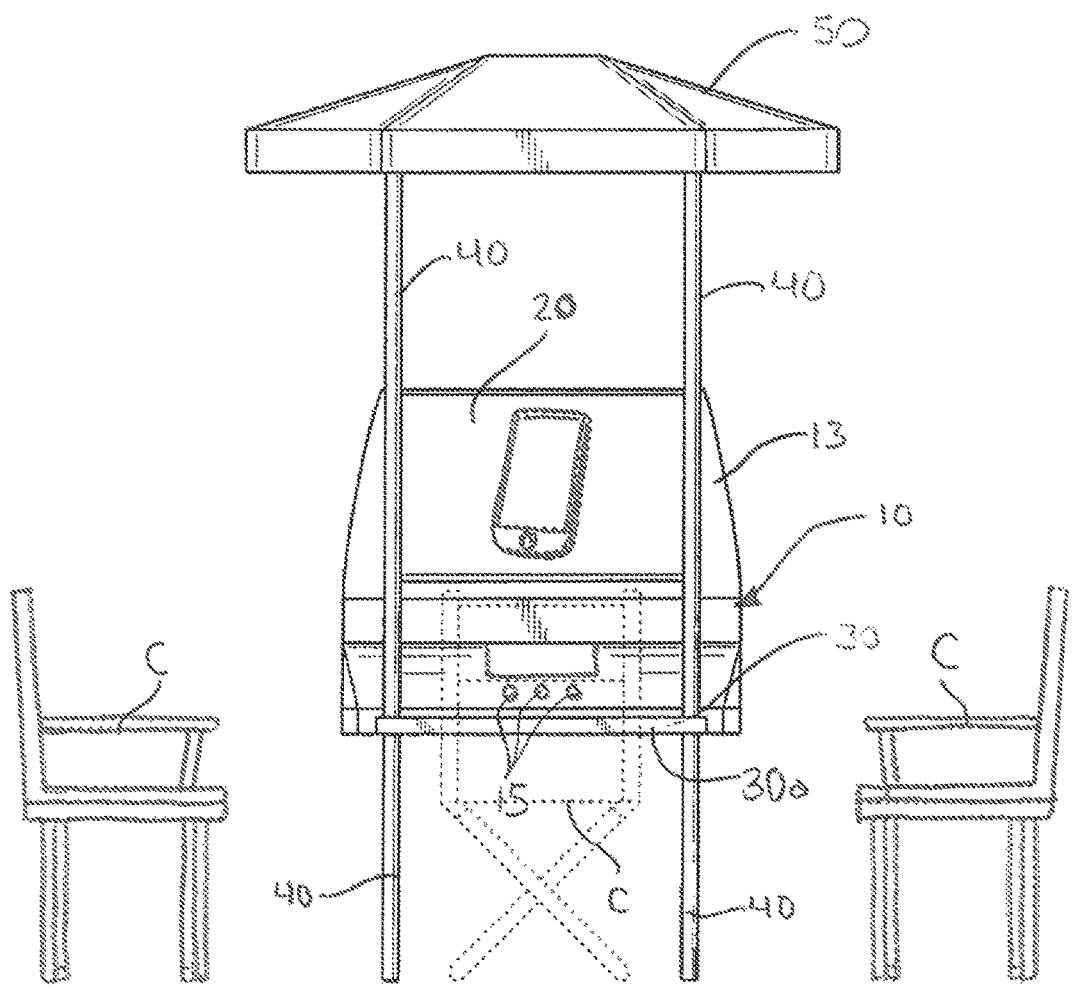
FIG. 6 is a front elevation view of the mobile display and marketing apparatus according to the exemplary embodiment.
Figure 7:
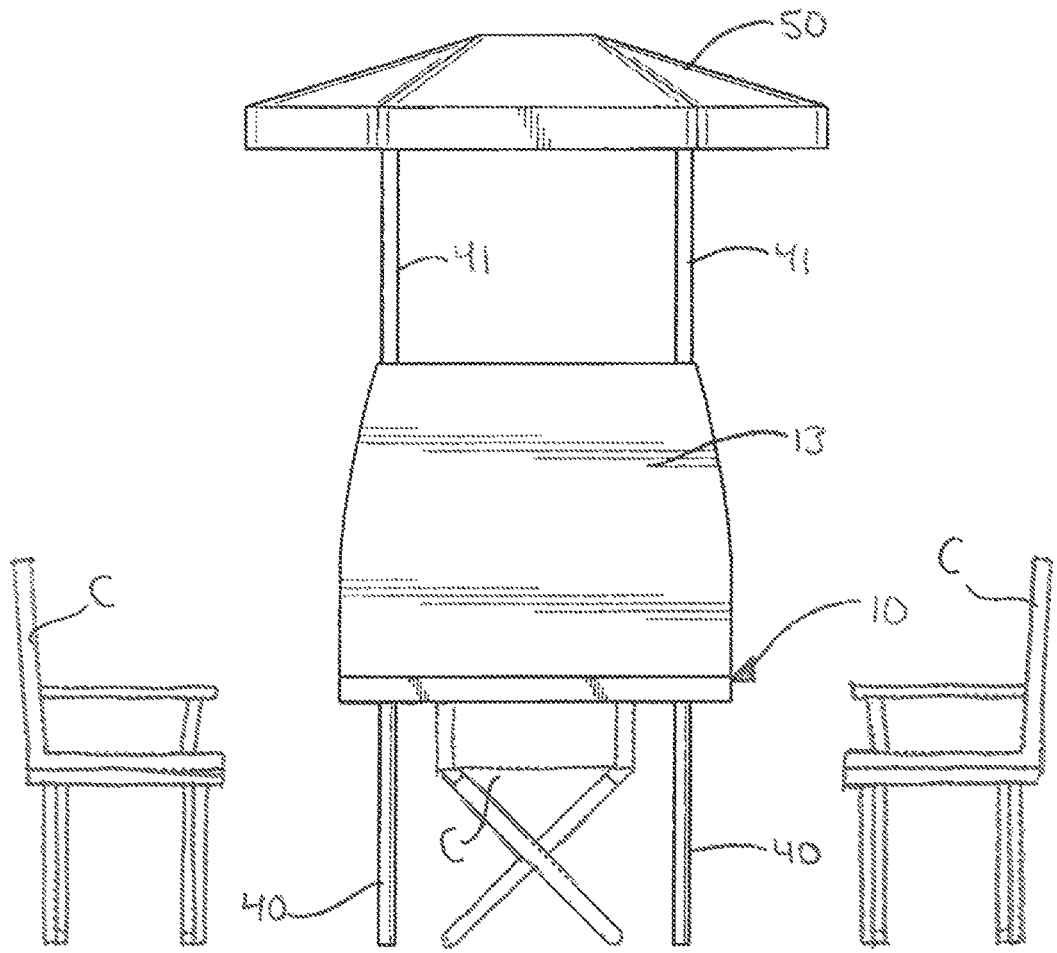
FIG. 7 is a rear view of the mobile display and marketing apparatus according to the exemplary embodiment.
Figure 8:
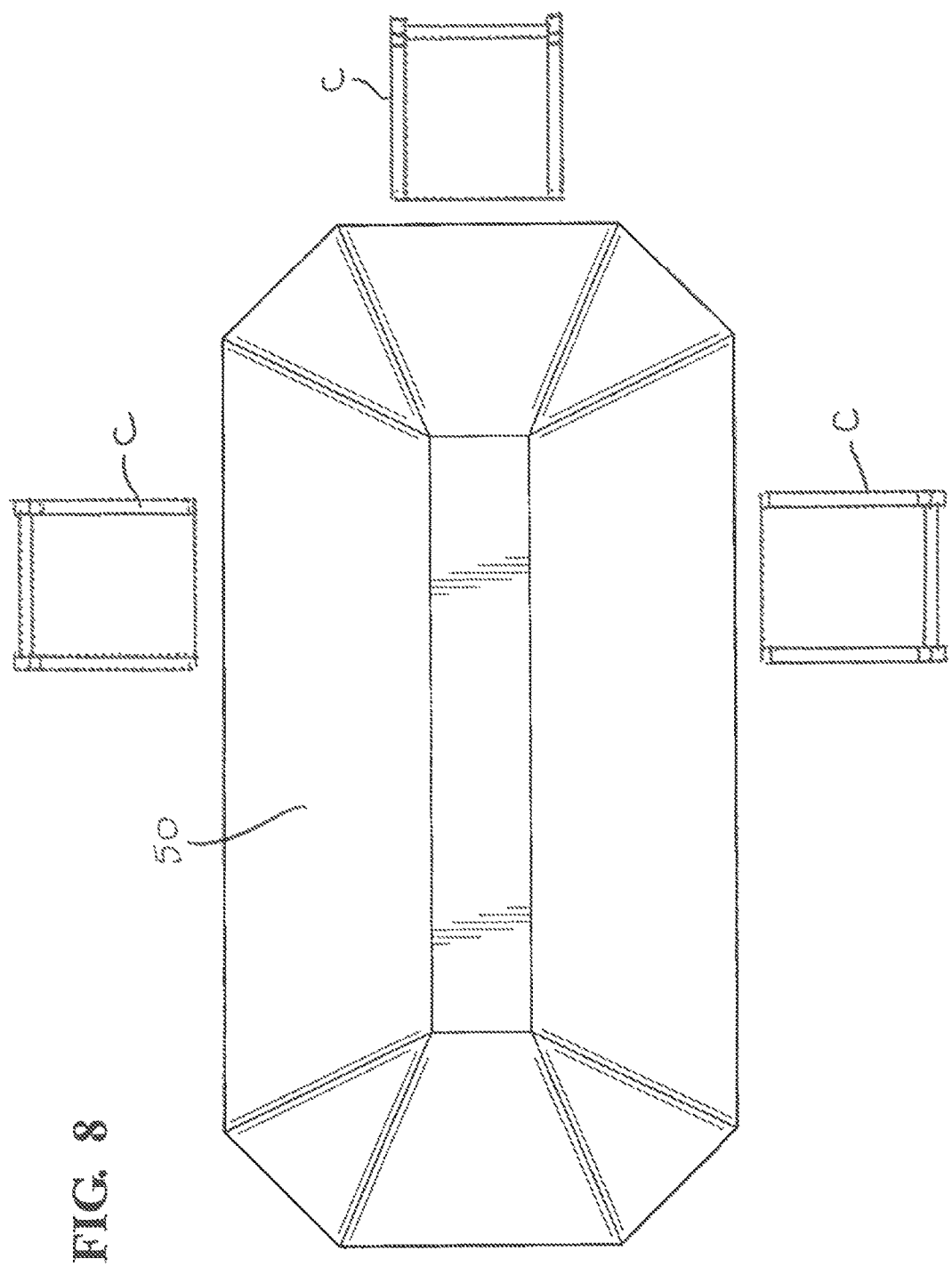
FIG. 8 is a top view of the mobile display and marketing apparatus according to the exemplary embodiment, taken from above the cover shown in FIGS. 1 through 4.

With particular reference to FIGS. 3-5, first part 10 defines a main body unit which, in the longitudinal direction, extends between first 10*a* and second 10*b* ends. Referring also to FIGS. 1-2, various elements are included for the display and/or presentation of products, services, and/or commercial information. In the exemplary embodiment, these elements include one or more bins 11 for housing products to be sold, one or more product display areas 12 on which products to be sold or marketed can be placed for viewing and, optionally, physical inspection by consumers, as well as a television or monitor 20 for the presentation of audiovisual content. Such audiovisual content may be provided via any conventional means. For instance, a computer or media playback equipment, such as, for example, a DVD player, CD player, etc. (not shown), may be connected to the monitor 20.

Figure 9:
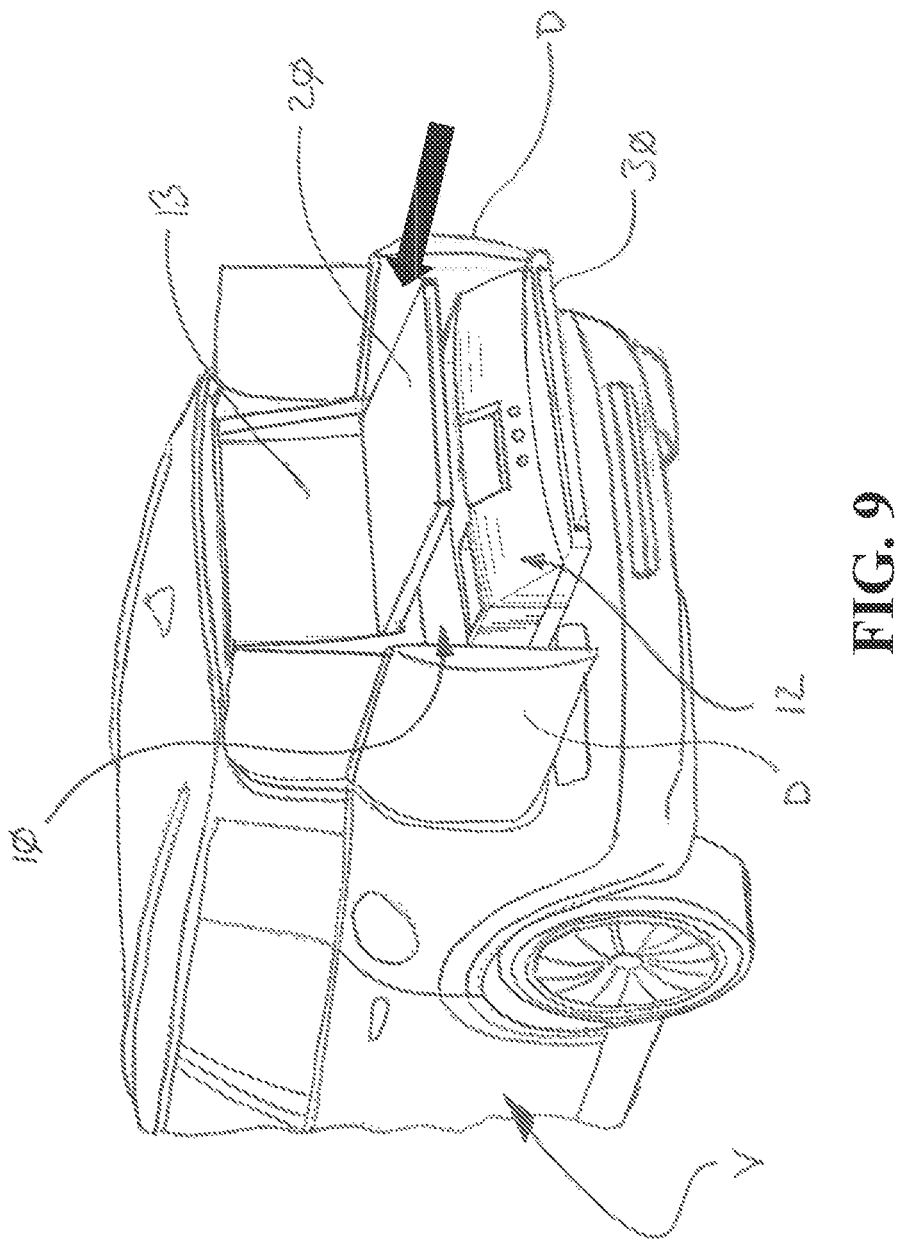
FIG. 9 is a perspective view of the mobile display and marketing apparatus according to the exemplary embodiment, showing the product display unit in the disassembled configuration and being stowed in the vehicle.

While, in the most basic form, monitor 20 may simply rest on the first part 10, the exemplary embodiment of the invention integrates the monitor 20 through the provision of a vertical support 13 of dimensions similar to those of the monitor. Vertical support 13, as shown, extends upwardly from the horizontally disposed portion of the first part 10 which is defined between ends 10*a* and 10*b*. Monitor 20 is secured to support 13 by means of any conventional mount (not visible). Optionally, the mount may be of the type that is articulated so as to permit the monitor 20 to be folded downwardly (so as to lie parallel to the opposing surface of the body unit) for storage purposes. See FIG. 9. Alternatively, it is contemplated that the support 13 itself may be articulated (such as, for instance, being hingedly connected to the rest of the first part 10) so that the monitor 20 and support 13 may, as a unit, be folded downwardly for storage. Alternatively, it is contemplated that neither the support 13 nor the monitor 20 are movable but, rather, that the apparatus is designed so that the monitor 20 and support 13 are always in the positions shown in the drawings.

Optionally, the at least the first part unit 10 may also include one or more power outlets 15. The provision of such outlets 15 may be desirable where, for instance, the apparatus 1 is employed in the marketing and sale of electronic devices (e.g., mobile phones, tablet computers, etc.). Power for such outlets 15 may be supplied by an electrical connection to the vehicle V transporting the apparatus 1. Such electrical connection may take any conventional form. For instance, the electrical connection may be made via the vehicle's onboard 12V power outlets. Alternatively, the one or more power outlets 15 may be electrically connected (also in conventional fashion) to one or more batteries carried in the vehicle for the exclusive purpose of providing power to the one or more outlets 15. In a further embodiment, the power outlets 15 may be powered via a power source external of the vehicle V. For example, there may be provided one or more power cords (e.g., an extension cord) connectable to a suitable power source (e.g., a standard indoor or outdoor electrical outlet) external of the vehicle. In all instances, it will be appreciated that the one or more power outlets 15 comprise the necessary, conventional electrical components to transfer power via the power source(s) (e.g., vehicle, one or more batteries, external power source, etc.).

In addition to the first part 10, the apparatus 1 comprises a second part 30 defining a transaction or display table. Second part 30 is at least substantially received in the first part 10 for storage and transportation while, in use, second part 30 extends from the first part 30 as shown in the drawings. To this end, the first part 10 in the simplest form thereof defines an opening therein in which the second part 30 is slidingly received. Alternatively, it is contemplated that the second part 30 may be secured to the first part 10 via conventional sliding rails such as of the type or design employed in sliding drawers. In any case, it is contemplated that the second part 30 and the first part 10 are sufficiently securely associated with one another that the apparatus 1 is stable when in the deployed configuration thereof (described further below).

According to the illustrated embodiment, the longitudinal dimensions of the second part 30 are such that the second part 30 is substantially received in the first part 10 when in the configuration for storage and transportation.

It may be seen from the drawings that, in the deployed condition of the apparatus 1, second part 30 extends from the first part 10 such that a free end 30a of second part 30 extends farthest away from the first part 10. This free end 30a is supported above the ground or other support surface S by one or more supports 40, as noted above. As described hereafter, these one or more supports 40 may also extend above the second part 30, as shown, so as to simultaneously define supports for a cover 50. Where no such cover 50 is employed, however, it is also contemplated that the one or more supports 40 may be secured to the second part 30 in the deployed condition of the apparatus 1, each such support 40 being received, for instance, in a socket defined on the underside of second part 30. In a further embodiment, the one or more supports 40 may be pivotally attached to the second part 30 and placed in their deployed or stowed configurations by appropriate pivotal movement (much in the same way as with a conventional "folding table"). It will be appreciated that, according to this latter embodiment, the one or more supports 40 and associated pivot mechanisms must be configured so as to avoid interfering with sliding receipt of second part 30 in the first part 10.

As shown, in the deployed condition of the apparatus 1 the second part 30 is slidingly extended from the first part 10 and the one or more supports 40 arranged proximate free end 30a so as to support the free end 30a above the ground or other support surface S. Also in this deployed condition, the first part 10 is substantially, but not entirely, withdrawn from cargo area of the vehicle V. As will be appreciated from the drawings, the first end 10a of the body unit 10 remains in contact with the vehicle V (e.g., by remaining in the cargo area) so that the end of the apparatus proximate first end 10a is likewise supported above the ground or other support surface despite the absence of supports such as supports 40 positioned adjacent the end 30a of second part 30.

As will be appreciated, the length of the one or more supports 40 should be commensurate in length to the height of the vehicle V at the location where the first end 10a of the first part 10 is supported in the deployed condition, if it is desired that the second part 30 be level, or at least substantially level, in the deployed condition of the apparatus.

As desired, one or more chairs C may be employed to provide seating for customers and/or salespeople.

According to the illustrated form of the invention, a cover 50 is provided which, in the deployed condition of the apparatus 1, is positioned above the first 10 and second 30 parts so as to provide shelter from the elements (e.g., sun, rain, etc.). The cover 50 may be made of any desired material, although it will be appreciated that a cover 50 of flexible material is advantageous in that it may be folded more compactly for storage when the apparatus is being transported. The cover 50 may, optionally, include indicia, such as logos or other designs, so as to make the mobile showroom more visible and/or to provide additional advertising/promotion.

Cover 50 may be supported above the first 10 and second 30 parts in any conventional manner. According to the illustrated embodiment more specifically, cover 50 is supported by a plurality of supports, including one or more supports 41 secured to the first part 10 and the one or more supports 40 secured to the second part 30. Supports 41 are received in sockets provided in the first part 10 and, more particularly, in the vertical support 13 thereof. Supports 40 may be received in similar sockets provided in second part 30. In the exemplary embodiment, however, it will be seen that supports 40 define each of supports for the cover 50 above the second part 30, as well as supports for the second part 30 above the support surface S. According to this construction, each support 40 is received through an opening in the second part 30 proximate free end 30a. Advantageously, this construction permits the height of the second part 30 at free end 30a to be adjusted by the simple expedient of extending relatively more or less of each one or more support 40 below the second part 30. As necessary, means may be provided (including, for instance and with limitation, set screws) for selectively fixing the height of the second part 30 relative to each support 40.

It is to be understood that, according to the embodiments described herein, each support 40 may be monolithic or unitary (i.e., comprised of two or more elements).

For stowage purposes, the cover 50 is detached from supports 40, 41 and, if cover 50 is made of a flexible material, folded for stowage. Supports 41 are, likewise, detached from the first part 10 and supports 40 are detached from second part 30 and, if comprised of two or more elements, further broken down into such constituent elements. Second part 30 is then slid into the first part 10. See FIG. 9 (the black arrow indicates the direction of movement of the second part 30 into the first part 10). If the monitor 20 or vertical support 13 are adapted to be folded for stowage, then they are folded accordingly. The first part 10 (with the monitor 20) and second part 30 are then slid, as a unit, completely back into the vehicle cargo area. Furthermore, the cover 50, supports 40, 41, as well as any optionally employed chairs C, may also be stowed in the vehicle cargo area.

As described, the present invention provides a mobile showroom which is at once simple in construction, easy to set up, and easy to disassemble for stowage in any of a variety of conventional, unmodified vehicles.

The above description is of the exemplary embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The invention in which an exclusive property or privilege is claimed is:

1. A mobile display and marketing apparatus, comprising:
a self-propelled vehicle having an interior storage area accessible from an exterior of the vehicle; and
a product display unit including a first part and a second part, wherein the second part is movable relative to the first part between a first position, in which the second part is received in the first part, and a second position, in which the second part extends away from the first part;
wherein the product display unit is characterized by a first, disassembled configuration in which the second part is in the first position thereof and at least the first and second parts are entirely contained in the interior storage area of the vehicle, and a second, assembled configuration in which the first part is partially disposed in the interior storage area of the vehicle and extends outwardly to the exterior of the vehicle, the second part is in the second position thereof, and at least a first support is connected to the second part and extends therefrom to contact the ground or other support surface to support the product display unit; and
wherein further an overall width of the second part is the same in both the disassembled and assembled configurations of the product display unit.

2. The mobile display and marketing apparatus of claim 1, further comprising a cover adapted to be positioned vertically above the product display unit by at least second and third supports, the second support connectible at a lower end thereof to the first part in the assembled configuration of the product display unit, and the third support connectible at a lower end thereof to the second part in the assembled configuration of the product display unit.

3. The mobile display and marketing apparatus of claim 2, wherein the first and third supports define a common support which is receivable through an opening in the second part so as to extend therethrough and to simultaneously position the cover vertically above the product display unit and define a support for the product display unit.

4. The mobile display and marketing apparatus of claim 3, wherein the first and third supports are a single, monolithic element.

5. The mobile display and marketing apparatus of claim 3, wherein the first and third supports are separate elements which are connected together to form a unitary element.

6. The mobile display and marketing apparatus of claim 1, wherein the first part includes a support surface and a monitor mounted on the support surface, the monitor adapted to display audiovisual content, and wherein further the monitor is substantially vertically oriented in the assembled configuration of the product display unit and substantially horizontally oriented in the disassembled configuration of the product display unit.

7. A mobile display and marketing apparatus, comprising:
a self-propelled vehicle having an interior storage area accessible from an exterior of the vehicle; and
a product display unit including a first part and a second part, wherein the second part is movable relative to the first part between a first position and a second position, the second position being characterized in that the second part extends away from the first part;
wherein the product display unit is characterized by a first, disassembled configuration in which the second part is in the first position thereof and at least the first and second parts are entirely contained in the interior storage area of the vehicle, and a second, assembled configuration in which the first part is partially disposed in the interior storage area of the vehicle and extends outwardly to the exterior of the vehicle, the second part is in the second position thereof, and at least a first support is connected to the second part and extends therefrom to contact the ground or other support surface to support the product display unit; and
further comprising a cover adapted to be positioned vertically above the product display unit by at least second and third supports, the second support connectible at a lower end thereof to the first part in the assembled configuration of the product display unit, and the third support connectible at a lower end thereof to the second part in the assembled configuration of the product display unit.

8. The mobile display and marketing apparatus of claim 7, wherein the first and third supports define a common support which is receivable through an opening in the second part so as to extend therethrough and to simultaneously position the cover vertically above the product display unit and define a support for the product display unit.

9. The mobile display and marketing apparatus of claim 8, wherein the first and third supports are a single, monolithic element.

10. The mobile display and marketing apparatus of claim 8, wherein the first and third supports are separate elements which are connected together to form a unitary element.

11. The mobile display and marketing apparatus of claim 7, wherein the first part includes a support surface and a monitor mounted on the support surface, the monitor adapted to display audiovisual content, and wherein further the monitor is substantially vertically oriented in the assembled configuration of the product display unit and substantially horizontally oriented in the disassembled configuration of the product display unit.

12. A mobile display and marketing apparatus, comprising:
a self-propelled vehicle having an interior storage area accessible from an exterior of the vehicle; and
a product display unit including a first part and a second part, wherein the second part is movable relative to the first part between a first position and a second position, the second position being characterized in that the second part extends away from the first part;
wherein further the product display unit is further characterized by a first, disassembled configuration in which the second part is in the first position thereof and at least the first and second parts are entirely contained in the interior storage area of the vehicle, and a second, assembled configuration in which the first part is partially disposed in the interior storage area of the vehicle and extends outwardly to the exterior of the vehicle, the second part is in the second position thereof, and at least a first support extends from the product display unit to contact the ground or other support surface to support the product display unit; and
wherein further dimensions of the second part in the assembled configuration of the product display unit do not exceed dimensions of the interior storage area of the vehicle.

13. The mobile display and marketing apparatus of claim 12, further comprising a cover adapted to be positioned vertically above the product display unit by at least second and third supports, the second support connectible at a lower end thereof to the product display unit in the assembled configuration, and the third support connectible at a lower end thereof to the product display unit in the assembled configuration.

14. The mobile display and marketing apparatus of claim 13, wherein the first and third supports define a common support which is receivable through an opening in the second part so as to extend therethrough and to simultaneously position the cover vertically above the product display unit and define a support for the product display unit.

15. The mobile display and marketing apparatus of claim 14, wherein the first and third supports are a single, monolithic element.

16. The mobile display and marketing apparatus of claim 14, wherein the first and third supports are separate elements which are connected together to form a unitary element.

17. The mobile display and marketing apparatus of claim 12, wherein the first part includes a support surface and a monitor mounted on the support surface, the monitor adapted to display audiovisual content, and wherein further the monitor is substantially vertically oriented in the assembled configuration of the product display unit and substantially horizontally oriented in the disassembled configuration of the product display unit.

18. The mobile display and marketing apparatus of claim 12, wherein further an overall width the second part is the same in both the disassembled and assembled configurations of the product display unit.

* * * * *